T. J. McNAMARA.
TREE PROTECTOR.
APPLICATION FILED JAN. 27, 1909.
948,339.
Patented Feb. 8, 1910.
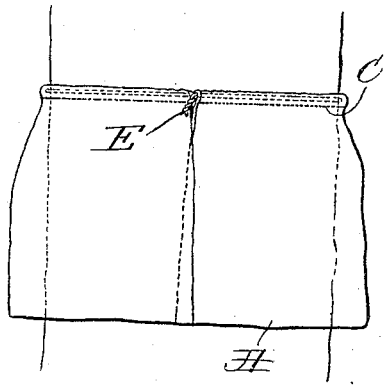
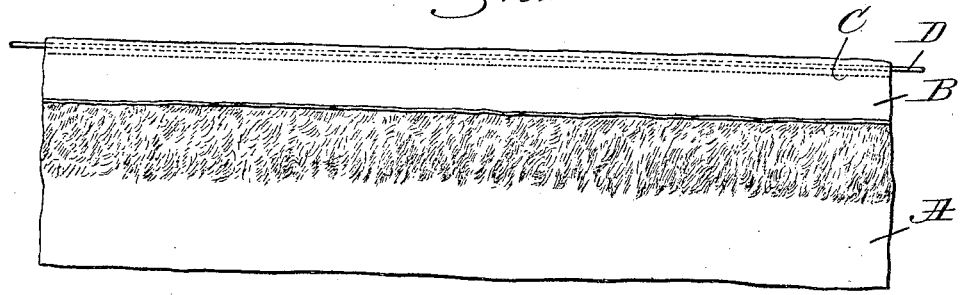
Witnesses:
Fred. S. Grumbaf.
Joseph M. Ward.
Inventor.
Thomas J. McNamara,
by Crosby & Gregory
attys.

UNITED STATES PATENT OFFICE.

THOMAS J. McNAMARA, OF CLINTON, MASSACHUSETTS.

TREE-PROTECTOR.

948,339.  Specification of Letters Patent.  Patented Feb. 8, 1910.

Application filed January 27, 1909. Serial No. 474,404.

*To all whom it may concern:*

Be it known that I, THOMAS J. McNA-MARA, a citizen of the United States, and a resident of Clinton, in the county of Worcester and State of Massachusetts, have invented an Improvement in Tree-Protectors, of which the following description, in connection with the accompanying drawing, is a specification, like letters on the drawing representing like parts.

This invention has for its object to provide an article in strip form which may be cut into pieces of suitable length and which is so constructed as to be suitable for protecting trees.

Owing to the increasing prevalence of tree pests, such as the gypsy and brown tail moths, it has become necessary to take vigorous action in the matter of protecting the trees. One of the most common practices has been to tie a strip of burlap with a string around the trunk or limb of the tree. The caterpillars crawling up the trunk or limb get beneath the burlap and there may be captured and destroyed.

In the present invention I provide an article in strip form peculiarly adapted for this purpose, so constructed that it may be cut up into sections to correspond with varying circumference of the trunk or limb, provided preferably with a wire by means of which it may be firmly secured in place, and provided with a belt of soft, felted, matted, or cotton-like substance to fit against, and conform closely to, the tree, and which may be impregnated with a poison or insecticide.

The nature of the invention will more fully appear from the accompanying description and drawings and will be particularly pointed out in the claim.

The drawings represent the article embodying the invention.

In the drawings, Figure 1 is a side elevation of a portion of a tree trunk or limb with the tree protector in place. Fig. 2 is an elevation of the strip forming the article. Fig. 3 is a cross-section of the construction shown in Fig. 2.

The article embodying this invention is made in a strip-like form. It comprises a wide and a narrow strip of some coarse textile material, such as ordinary burlap, these strips being fastened together near one edge. The two strips may be formed from one wide strip by folding the material lengthwise to form a narrow and a wide strip, and this construction is illustrated in the drawings, where A represents the wide and B the narrow strip. The strips, whether formed separately or in one piece, are so fastened together as to provide a pocket. This is done in the construction illustrated by a line of stitching C which forms the pocket at the upper edge of the strips. This pocket provides a location for the cord or wire by which the material is to be fastened around the tree. Preferably I insert in the pocket a wire D.

Between the strips A and B and secured in position by any suitable means, as by the stitching C, is interposed a belt of some soft, yielding, felted, or matted, or cotton-like substance. I preferably use a low grade of raw cotton waste. This belt of material protrudes from between the strips in a fluffy-like mass. Preferably I charge this fluffy-like belt of material with a suitable poison or insecticide which will act to stupefy or kill the caterpillars or other insects coming into contact with it. The material illustrated and described may be manufactured and sold in rolls or bundles. When it is desired to use the article a strip slightly greater in length than the circumference of the trunk or limb of the tree is cut off. The material is crowded back a little on the ends of the wire. The material is then wrapped around the tree with the narrow strip against the tree, and consequently with the fluffy-like belt in contact with the tree. The ends of the wire are brought together and twisted, as shown at E, to hold the material closely in contact with the tree. The fluffy-like belt comes in contact with and conforms closely to all the irregularities of the tree. It will thus be seen that when insects or caterpillars crawl up the trunk or limb of the tree they will be caught beneath the strip A and by the fluffy-like belt of material. Here they will be retained until removed or if the belt be charged with a poison or insecticide will be stupefied or killed.

The article can be cheaply made and is found to be highly efficient in securing the desired results. It can be simply and easily applied to the tree and readily removed and replaced when desired.

Having described my invention, what I claim as new and desire to secure by Letters Patent, is:

A tree protector comprising a strip of textile material folded longitudinally to present a narrow and a wide strip and stitched together to present a longitudinal pocket at the fold, said narrow strip extending below said pocket, a wire in said pocket, a belt of raw cotton waste secured between said strips by the stitching in forming the pocket and protruding therefrom.

In testimony whereof, I have signed my name to this specification, in the presence of two subscribing witnesses.

THOMAS J. McNAMARA.

Witnesses:
GEORGE L. DRURY,
WILLIAM H. DIETZMAN.